(12) United States Patent
Heckel et al.

(10) Patent No.: US 6,532,508 B2
(45) Date of Patent: Mar. 11, 2003

(54) CONTROL SYSTEM FOR CONTROLLING SAFETY-CRITICAL PROCESSES

(75) Inventors: Andreas Heckel, Remshalden (DE); Klaus Wohnhaas, Fellbach (DE); Roland Rupp, Hattenhofen (DE)

(73) Assignee: Pilz GmbH & Co., Ostfildern (DE)

( * ) Notice: Subject to any disclaimer, the term of this patent is extended or adjusted under 35 U.S.C. 154(b) by 0 days.

(21) Appl. No.: 10/029,894

(22) Filed: Dec. 21, 2001

(65) Prior Publication Data

US 2002/0126620 A1 Sep. 12, 2002

Related U.S. Application Data

(63) Continuation of application No. PCT/EP00/05763, filed on Jun. 21, 2000.

(30) Foreign Application Priority Data

Jun. 22, 1999 (DE) .......................................... 199 28 517

(51) Int. Cl.[7] .............................................. G06F 13/00
(52) U.S. Cl. .......................... 710/110; 709/227; 700/3; 710/107; 714/47; 370/216
(58) Field of Search ................................ 710/107, 110; 709/227, 233; 700/2, 3, 4, 5; 714/11, 47, 49; 370/216, 241, 362

(56) References Cited

U.S. PATENT DOCUMENTS

| | | | | |
|---|---|---|---|---|
| 5,020,143 A | * | 5/1991 | Duckeck et al. | ............. 340/905 |
| 5,553,237 A | * | 9/1996 | Eisenberg et al. | ............. 714/26 |
| 5,561,767 A | * | 10/1996 | Eisenberg et al. | ............. 714/11 |
| 6,041,415 A | | 3/2000 | Förster et al. | |
| 6,320,685 B1 | * | 11/2001 | Griessbach et al. | ......... 359/143 |
| 6,347,252 B1 | * | 2/2002 | Behr et al. | ..................... 700/2 |

FOREIGN PATENT DOCUMENTS

| | | |
|---|---|---|
| DE | 44 16 795 C2 | 11/1995 |
| DE | 44 33 103 A1 | 3/1996 |
| DE | 196 12 423 A1 | 10/1997 |
| DE | 196 19 886 A1 | 11/1997 |
| DE | 297 18 102 U1 | 1/1998 |
| DE | 197 36 581 A1 | 4/1998 |
| DE | 197 54 769 A1 | 6/1999 |
| DE | 198 57 683 A1 | 6/2000 |
| DE | 198 60 358 A1 | 7/2000 |
| DE | 199 04 892 A1 | 8/2000 |
| DE | 199 04 893 A1 | 8/2000 |
| DE | 199 04 894 A1 | 8/2000 |
| EP | 0 601 216 A1 | 6/1994 |
| EP | 0 905 594 A1 | 3/1999 |

OTHER PUBLICATIONS

"Das Interbus–S–Übertragungsverfahren," pp. 39–41, Dec. 12, 2001.

* cited by examiner

Primary Examiner—Rupal Dharia
(74) Attorney, Agent, or Firm—Cohen, Pontani, Lieberman & Pavane

(57) ABSTRACT

The present invention describes a control system for controlling safety-critical processes. The control system has a first control unit for controlling a safety-critical process and at least one signal unit linked to the safety-critical process via I/O channels. It further comprises a field bus connecting said first control unit and said signal unit, and a bus master for controlling communication on said field bus. Said first control unit and said signal unit each comprise safety-directed arrangements for ensuring failsafe communication among each other. Said bus master is connected to said field bus separately from said first control unit and said signal unit.

16 Claims, 3 Drawing Sheets

CONTROL SYSTEM FOR CONTROLLING SAFETY-CRITICAL PROCESSES

CROSSREFERENCES TO RELATED APPLICATIONS

This application is a continuation of copending international patent application PCT/EP00/05763 filed on Jun. 21, 2000 and designating the U.S., which claims priority of German patent application DE 199 28 517.9 filed on Jun. 22, 1999.

BACKGROUND OF THE INVENTION

The present invention relates to a control system for controlling safety-critical processes, having a first control unit for controlling safety-critical processes and at least one signal unit linked to the safety-critical processes via I/O channels, and further having a field bus connecting the first control unit and the signal unit, and a bus master for controlling communication on the field bus, said first control unit and said signal unit comprising safety-directed arrangements for ensuring failsafe communication among each other.

Use of field buses for data communication between separate units involved in the control of a process is sufficiently known today in control and automation technology. The term field bus is used in this connection to describe a data communication system to which, ideally, any desired units can be connected that communicate with each other via the common field bus. Communication between the units is governed by specified protocols. Such a communication system is in contrast to a point-to-point communication link between two units where other units are completely cut off from the communication between such units. Examples of known field buses are the so-called CANbus, Profibus or Interbus.

In many field buses, communication is controlled by at least one bus master that is primary to the other units connected to the field bus, designated here as stations. This has the result that no data can be sent by any station to any other station without "permission" and control of the bus master. Usually, the bus master is a standard module which implements the protocols specified for the field bus, and which is often relatively complex and, thus, considerably expensive.

Although the use of field buses offers numerous advantages, mainly with respect to the high cabling effort that would otherwise be required, it was not possible heretofore to employ field buses in practical use for controlling safety-critical processes. The reason is that due to their structure being freely accessible for any units, the degree of failsafety necessary for controlling safety-critical processes could not be guaranteed.

The term safety-critical process is understood in the present invention to describe a process which, in case of a fault, would present a risk for people and goods that may not be neglected. Ideally, it must be 100% guaranteed for any safety-critical process that the process will be transferred to a safe state in case a fault should occur. Such safety-critical process may also be partial processes of larger, higher-level overall processes. Examples for safety-critical processes are chemical processes, where it is an absolute necessity to keep critical parameters within predetermined limits, or complex machine controls, such as the control of a hydraulic press or of an entire production line. In the case of a hydraulic press, for example, the material feeding process may be a non-safety-critical partial process, whereas the process of starting the pressing tool may be a safety-critical partial process, as part of the overall process. Other examples of (partial) safety-critical processes are the monitoring of guards, protective doors or light barriers, the control of two-hand switches or the reaction to emergency shut-down devices.

DE 197 42 716 A1 discloses a control and data transmission system, which is based on a field bus, especially the one known as Interbus, and which had for its object to integrate safety-directed modules. It was proposed to achieve this object by implementing safety-directed arrangements in both the bus master, designated as master control unit in the cited publication, and the stations. In addition to the data communication as such, the safety-directed arrangements perform safety functions that guarantee the required fail-safety with respect to the control of safety-critical processes. To say it in more concrete terms, the required safety is achieved in this case mainly by making the bus master "safe" through implementing safety-directed arrangements.

However, implementing such arrangements is very laborious and costly in the development and construction of a failsafe control system, since one cannot make use of standard modules for this purpose any longer, but is required to develop the complex bus master as such.

In addition, such an approach is of disadvantage also in operation of a control system based thereon, because in the control of complex processes the safety-directed communication amounts to only 10% of the whole communication volume. The known approach leads therefore to the disadvantage that the bus master is made "safe" at high expense, although this is not necessary for 90% and more of the communication volume controlled by it.

SUMMARY OF THE INVENTION

It is an object of the present invention to provide a control system that provides failsafe communication between units involved in controlling a safety-critical process.

It is another object of the present invention to provide a control system for controlling safety-critical processes that can be build up using standard modules as bus masters.

It is another object of the present invention to provide a control system for controlling safety-critical processes having a control unit and a plurality of signal units, wherein said control unit can communicate with said signal units across a field bus without simultaneously having bus master functionality.

These objects are particularly achieved with a control system as mentioned at the outset, wherein the bus master is connected to the field bus independently of the first control unit and the plurality of signal units.

Due to the safety-directed arrangements, the first control unit is a "safe" control unit, which means that it is in a position to determine, and to correct, both internal and external faults, if necessary by interaction with other safe units. To say it in more concrete terms, this feature means that the first control unit for controlling safety-critical processes on the one hand and the bus master on the other hand are accommodated in separate modules, and they are both connected to the field bus separately. It is feasible to connect the first control unit to the field bus as a simple station, i.e. without any bus master functionality, as will be described hereafter with reference to the Interbus, by way of example. The control of the safety-critical process can then be effected largely independently of the control of any non-safety-critical processes, and also independently of the control of data communication on a common field bus.

The control unit does therefore not require any bus master functionality, and conversely the bus master can be connected to the field bus without any safety-directed arrangements. This allows the use of conventional standard bus master modules.

The invention further provides the advantage that the first control unit, and with it the safety-directed arrangements, have to be adapted only to the comparatively small volume of safety-directed data traffic, as regards their complexity and speed. The portion of non-safety-directed data traffic, which may amount to 90 % and more in a complex overall process, need not be handled via the first control unit or via the safety-directed arrangements. Accordingly, the first control unit and the safety-directed arrangements can be given a relatively simple structure.

According to an embodiment of the above-mentioned feature, the first control unit comprises an independent control program for controlling the safety-critical process.

In this connection, the term independent control program is meant to describe a control program that puts the first control unit in a position to control the safety-critical process independently of other control units. The first control unit, therefore, instead of being merely a redundant element supplementing another control unit, is in a position to control the safety-critical process independently and in a failsafe manner. The feature is especially advantageous insofar as it provides complete separation of the safety-directed parts of the control system from the non-safety-critical parts. This is of particular importance in connection with the certification of a control system by the competent supervision authorities because any influence on the safety-directed part by manipulation of the non-safety-directed part is excluded in this way.

According to a further embodiment, the first control unit is capable of generating a failsafe bus telegram the receipt of which causes the signal unit to transfer the safety-critical process to a safe state.

If the safety-critical process concerns, for example, the monitoring of an emergency shut-down device, a safe state may be reached, for example, by immediately de-energizing the whole process. In the case of a chemical production system making the entire system dead might, however, permit uncontrolled reactions to take place so that in this case the term safe state is defined as the setting of predetermined parameter ranges. The described measure is in contrast to the solution that realizes the transfer of the process to a safe state via additional control lines, separate from the field bus. This was preferred heretofore because a failsafe bus telegram is possible only in conjunction with safety-directed arrangements. In contrast, the described measure provides the advantage that it is now possible to work without corresponding additional control lines, whereby the cabling effort is once more reduced.

According to a another embodiment, the safety-directed arrangements comprise a multi-channel structure.

The term multi-channel structure as used in this connection means that the safety-directed arrangements comprise at least two parallel processing channels that are redundant one with respect to the other. This feature provides the advantage that a fault occurring in one of the processing channels can be discovered, for example, by the fact that one result deviates from the results of the other processing channel or channels, and can then be corrected, if necessary. Thus, this feature contributes in a very reliable manner to ward improving failsafety.

Preferably, the multi-channel structure is based on the diversity principle.

This means that the different channels of the multi-channel structure are built up differently. For example, one channel may be based on a microcontroller from one manufacturer, while another channel is based on a microcontroller from a second manufacturer. Accordingly, the control programs of the micro-controllers will also differ one from the other in that case. Alternatively, one of the channels may have a hard-wired logic, instead of a microcontroller. The described feature provides the advantage that failsafety is once more considerably improved due to the fact that the probability of the same faults occurring at the same time is considerably reduced in structures of a diverse nature, compared with homogenous structures.

According to a further embodiment of the invention, the control system comprises a second control unit for controlling non-safety-critical processes.

Preferably, the second control unit is a standard control unit, i.e. a control unit available as a standard module. This feature is particularly advantageous where the control system is to be employed for controlling complex overall processes as in this case all non-safety-critical processes can be controlled separately from the safety-critical partial processes. In addition, the first control unit can be relieved of non-safety-critical tasks. This allows the first control unit and, in addition, the entire control system to be given an especially low-cost and efficient design.

According to a further development of the before-mentioned measure, the second control unit is connected to the field bus separately from the first control unit.

This feature provides the advantage that safety-directed processes are separated even more strictly from non-safety-directed processes, which reduces the risk that the safety-directed controls may be influenced unintentionally still further. Moreover, it is thus rendered possible to retrofit a first control unit for controlling safety-critical processes in an existing overall system, without having to exchange a standard control unit previously used in that control system. This permits existing control systems that include safety-directed components to be retrofitted easily and at low cost.

According to a further embodiment of the measures described before, the second control unit is free from safety-directed arrangements.

This means that the second control unit does not comprise safety-directed arrangements. This feature provides the advantage that the second control unit, too, is kept free of unnecessary ballast. This permits low-cost standard modules to be used for the second control unit.

According to a further embodiment of the feature discussed before, the bus master is incorporated in the second control unit.

This feature provides the advantage that it reduces the number of units connected to the field bus employed. Moreover, control units with integrated bus master are available as standard modules from different manufacturers. Consequently, the described feature can be implemented at low cost and efficiently.

According to a further embodiment of the invention, the field bus provides circulating telegram traffic between different units connected to the field bus. To this end, the field bus, preferably, is an Interbus.

Field buses with circulating telegram traffic are known as such in the art. The Interbus, used by preference, may serve as an example in this connection. In principle, such field buses are designed in the manner of a shift register where the units connected to the field bus are the sequentially arranged storage positions. Controlled by the bus master, a data word is sequentially shifted from one unit to the next. Due to suitable measures, which may be different for different field buses, a connected unit will recognize that a shifted bus telegram contains portions intended for it.

The described feature provides the advantage that it permits a very efficient control system to be implemented in a simple way and with extremely low cabling effort. The use of an Interbus as field bus moreover provides the advantage that a unit is capable of identifying bus telegrams intended for it in an especially simple way. This makes the system little susceptible to faults.

According to a further embodiment of the invention, the first control unit is arranged upstream of the signal unit, relative to the circulating direction of the telegram traffic.

This feature is especially advantageous insofar as it guarantees, in a simple way, that the signal unit will receive only such data that have been generated by the first control unit.

According to a further embodiment of the previously described measure, the first control unit comprises means for replacing any telegram data, addressed to the signal unit, by failsafe telegram data.

The described feature is a very simple and, thus, advantageous way of guaranteeing that the signal unit involved in a safety-critical process will exclusively receive failsafe telegram data. To say it in more concrete terms, the sequentially circulating telegram traffic is utilized for this purpose insofar as a telegram is permitted to reach the specified signal unit only if it was generated by the first control unit.

According to a further embodiment of the invention, the control system comprises at least two first control units for controlling at least two safety-critical processes.

This feature provides the possibility to control very complex overall processes, comprising different safety-critical partial processes, individually and independently one from the other and in an extremely simple and low-cost way. It is a particular advantage in this connection that none of the first control units is required to have a bus master functionality, which contributes to keeping the cost of the overall system low.

It is understood that the features recited above and those yet to be explained below can be used not only in the respective combination indicated, but also in other combinations or in isolation, without leaving the context of the present invention.

BRIEF DESCRIPTION OF THE DRAWINGS

Exemplary embodiments of the invention are shown in the drawings and are explained in more detail in the description which follows. In the drawings.

DETAILED DESCRIPTION OF PREFERRED EMBODIMENTS

Figure 1:
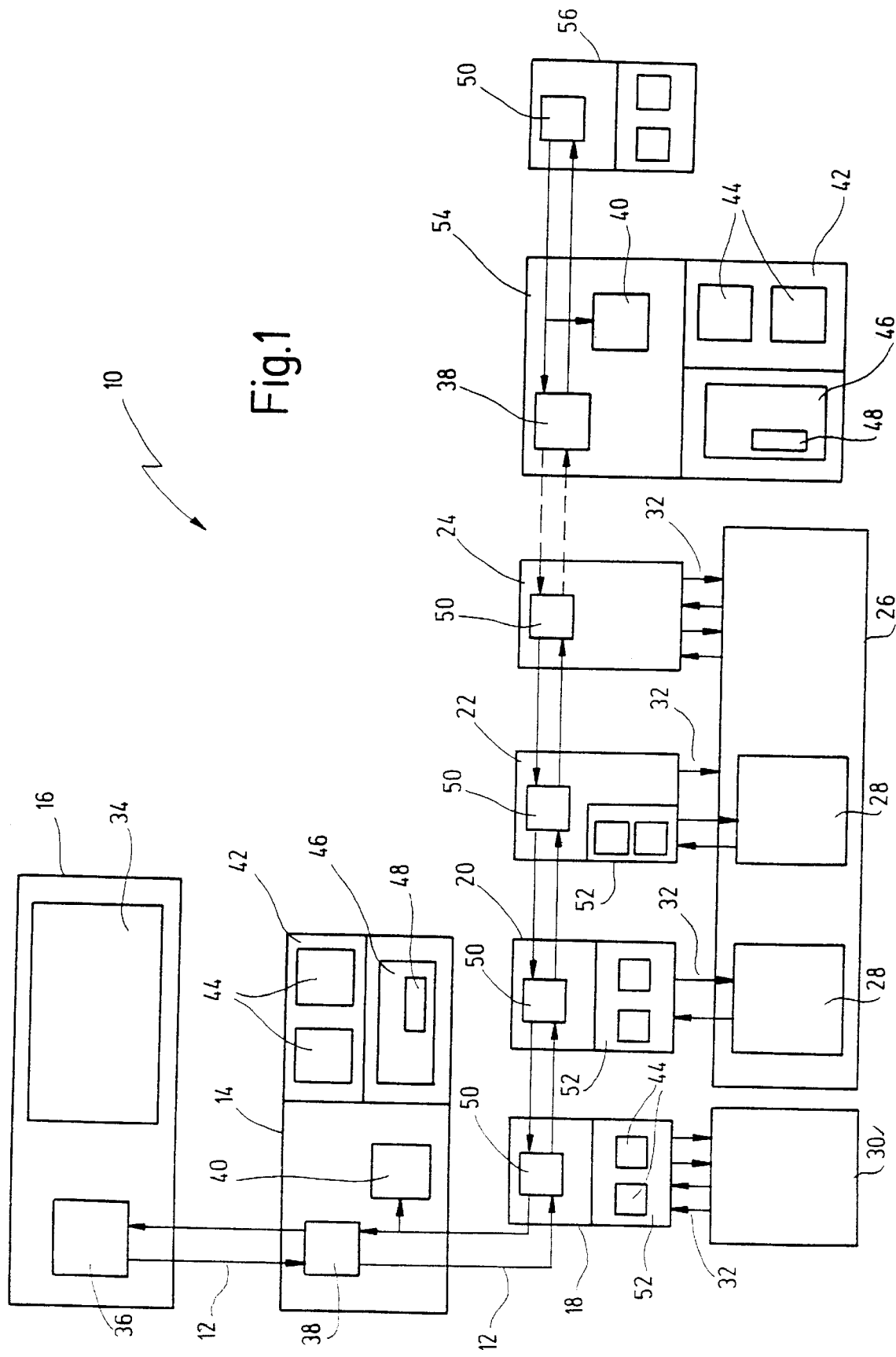
FIG. 1 shows a diagrammatic representation of a preferred embodiment of the invention, with an Interbus used as field bus.

In FIG. 1, a control system according to the invention is indicated in its entirety by reference numeral 10.

The control system 10 is based on a field bus 12, in the present case an Interbus. Connected to the field bus 12 are a first control unit 14, a second control unit 16 and a total of four signal units 18, 20, 22 and 24 shown by way of example. The first control unit 14 is a safe control unit, while the second control unit 16 is a standard control unit.

An automated overall process, containing two safety-critical partial processes 28, shown by way of example, is indicated by reference numeral 26. The parts of the overall process outside the safety-critical partial processes 28 are not safety-critical, i.e. they do not require any safety-directed additional measures. The overall process 26 relates, by way of example, to the automated control of a press, where the feeding processes for the parts to be processed (not shown), represent non-safety-critical partial processes, among others. The safety-critical partial processes 28 relate in this case, for example, to the control and monitoring of a two-hand switch and a guard.

Reference numeral 30 is used to indicate a process that is entirely safety-critical, such as the monitoring of an emergency shut-down device.

The control units 18 to 24 are connected to the processes 26 to 30 to be controlled via I/O channels (input/output channels) 32. The I/O channels 32 provide inputs and outputs through which status information signals characteristic of the processes to be controlled can be read in, and control signals for controlling the processes can be output. In practice, sensors and/or actuators—not shown in the drawing—are connected to the I/O channels 32.

In addition to other components that are known as such, the second control unit 16 comprises a microcontroller 34 and a master protocol chip 36. In the present case, the master protocol chip 36 has bus master functionality for an Interbus, and will be described hereafter also as bus master. Such master protocol chips are available as standard modules from different manufacturers.

The first control unit 14 is connected as a station to the field bus 12 via a communication module 38, the structure of which will be described hereafter with reference to FIG. 2. In addition, the first control unit 14 comprises in the present case a receiving module 40 connected to the return signal path of the field bus 12.

Moreover, the first control unit 14 comprises a safety-directed arrangement 42 including, in the present case, a multi-channel diversity-based microcontroller system. The multi-channel microcontroller system is symbolized in the present case by two redundant microcontrollers 44 from different manufacturers, which therefore require different programming. The safety-directed arrangement 42 implements error control measures which, in connection with the safety-directed arrangements in the signal units 18 to 22 described below, permit failsafe data communication. Examples of possible error control measures are described in a paper entitled "Bus-Software mit Feuermelder (Bus Software with Fire Alarm)", published in "iee", 43th edition 1998, No. 8, pp. 46 to 48.

The first control unit 14 further comprises a memory 46 in which a control program 48 is stored. The control program 48 is autonomous insofar as it puts the first control unit 14 in a position to control the safety-critical process 30, and the safety-critical partial processes 28, independently of the second control unit 16 (except for the communication on the field bus 12 controlled by the bus master 36).

The signal units 18 to 24 are each connected as stations to the field bus 12, via a slave protocol chip 50. The slave protocol chip 50 likewise is a standard module available from different manufacturers. Moreover, the signal units 18, 20 and 22 comprise safety-directed arrangements 52 which again include a two-channel microcontroller system 44. According to the example of signal units 18 and 20, all signals transmitted through them may be handled with the aid of the safety-directed arrangements 52. Accordingly, the signal units 18 and 20 are entirely "safe" signal units. The signal unit 22 is a "safe" signal unit only in part, i.e. only part of the signals handled by that unit is subject to control and monitoring by the safety-directed arrangements 52. In contrast, the signal unit 24 does not have any safety-directed arrangements and is, as such, a "non-safe" standard signal unit.

Signal unit 18 is connected to the safety-critical process 30, signal unit 20 to one of the safety-critical partial processes 28. These processes are exclusively and autonomously controlled by the first control unit 14. The signal unit 22 is connected, with its safe part, to the second safety-critical partial process 28, while producing with its non-safe part a control signal for the remaining non-safety-critical overall process 26. Accordingly, signal unit 22 is controlled, with respect to its safe part, by the first control unit 14 and, with respect to its non-safe part, by the second control unit 16. This makes it possible to address both a safe and a non-safe signal unit under one and the same bus address.

The signal unit 24 is exclusively connected to non-safety-critical parts of the overall process 26 and is addressed exclusively by the second control unit 16.

In contrast to the embodiment shown, it would likewise be possible, in principle, to control the standard signal unit 24 via the first control unit 14, although in this case completely failsafe communication cannot be guaranteed.

Another safe control unit, the structure and function of which correspond to the first control unit 14, is designated by reference numeral 54. Reference numeral 56 designates another safe signal unit. First control unit 54 and safe signal unit 56 can be connected to the field bus 12 in addition to the units described before, which is indicated by a broken line. For the sake of simplicity it will, however, be assumed in the discussion of the operation of the control system 10 that the safe control unit 54 and safe signal unit 56 are not connected to the field bus 12.

Figure 2:
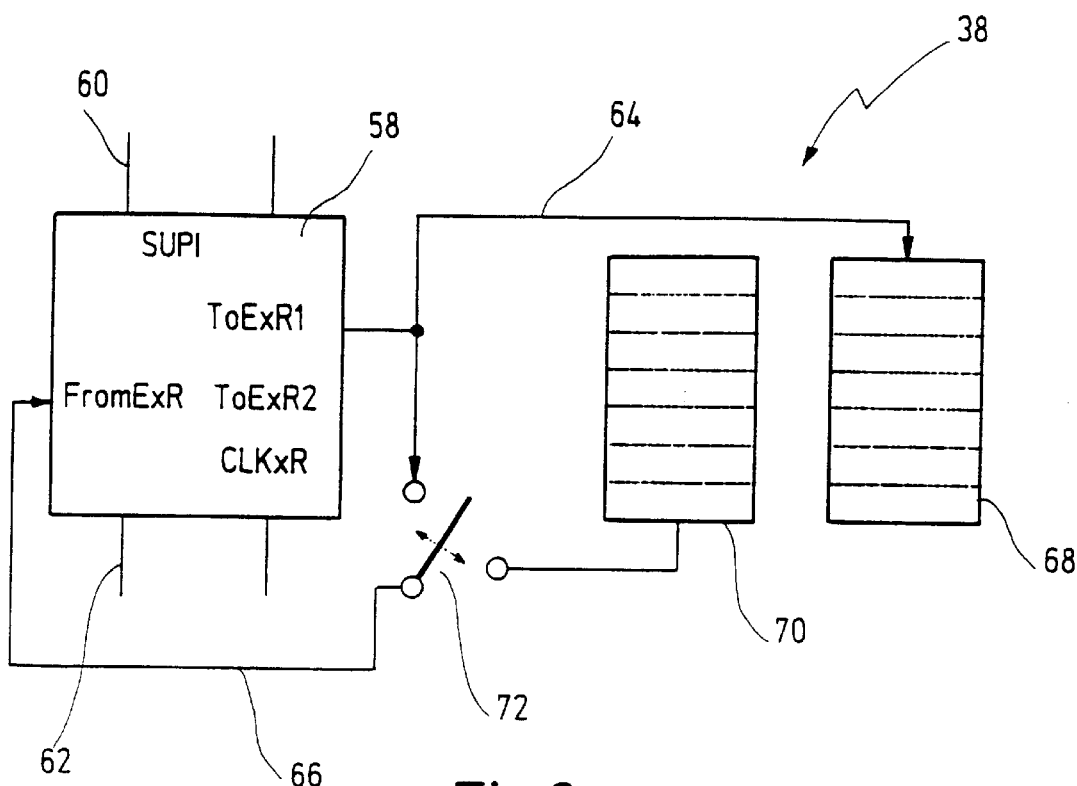
FIG. 2 shows a diagrammatic representation of a communication module by which the first control unit is connected to the Interbus in the embodiment illustrated in FIG. 1.

The communication module 38 contained in the first control unit 14 and shown more detailed in FIG. 2 comprises a slave protocol chip 58 connected to the field bus 12 on its input via a first bus connection 60 and on its output via a second bus connection 62. The protocol chip 58 corresponds to the protocol chips 50 contained in the signal units 18 to 24, and is often designated as "Serial Microprocessor Interface" (SUPI) in the case of the Interbus to which the present description relates.

In addition, the protocol chip 58 comprises further inputs and outputs, with one input FromExR (From External Receiver), two inputs ToExR1 and ToExR2 (To External Receiver) and one clock output CLKxR being indicated in the drawing by way of example. A signal line 64 is connected to the output ToExR1, a signal line 66 is connected to the input FromExR. The signal line 66 connects the protocol chip 58 to a receive memory 68. In addition, the communication module 38 also comprises a transmit memory 70. The signal line 66 connects the input FromExR of the protocol chip 58, via means illustrated as a switch 72, selectively with the output ToExR1 or the transmit memory 70. The operation of the communication module 38 will now be described as follows:

The protocol module 58 receives at its bus connection 60 a bus telegram that has been output to the field bus 12 by the bus master 36. The data contained therein are made available at the output ToExR1 and supplied to the receive memory 68 via signal line 64. When switch 72 occupies a position in which the signal line 66 is connected to the output ToExR1, the telegram data received are simultaneously supplied to the input FromExR and are then transmitted by the protocol chip 58 via bus connection 62 to a downstream station, here the safe signal unit 18. In this case, the data contained in the bus telegram are, on the one hand, loaded into the receive memory 68 and, on the other hand, passed through protocol chip 58 unchanged. In contrast, in case that the switch 72 connects the input FromExR with the transmit memory 70, telegram data taken from the transmit memory 70 are sent by protocol chip 58 to a downstream unit. By throwing over the switch 72 it is thus possible to replace the data contained in a bus telegram optionally and selectively by data from the transmit memory 70. This can be made very selectively, down to the bit level.

Figure 3:
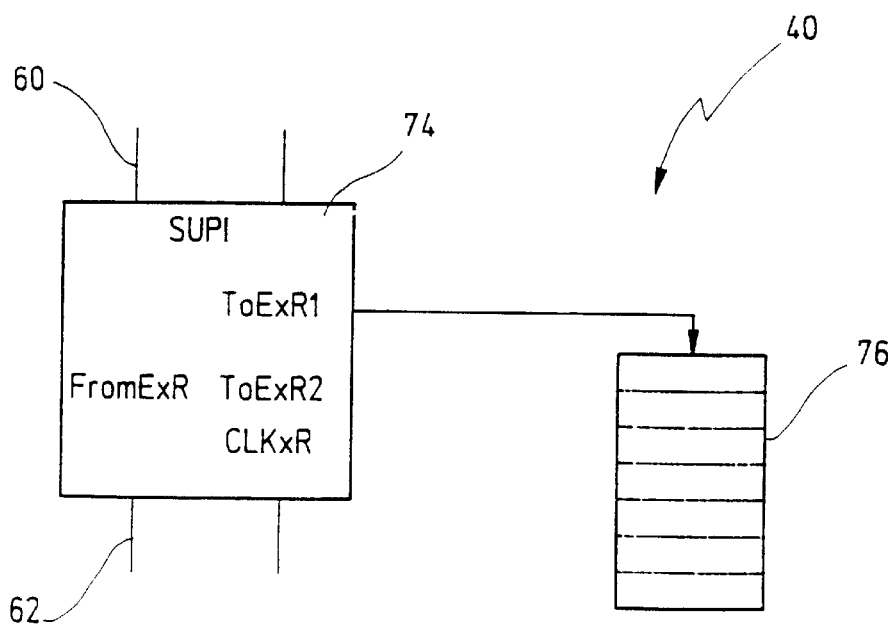
FIG. 3 shows a diagrammatic representation of a receiving module additionally comprised in the first control unit in the illustrated embodiment.

The receiving module 40 of the first control unit 14, illustrated in FIG. 3, is based on the same slave protocol chip (SUPI) as the communication module 38. For purposes of differentiation, the protocol chip is indicated here by reference numeral 74. Being a receiving module, the protocol chip 74 has its output ToExR1 solely connected to a receive memory 76.

Via the communication module 38, the first control unit 40 is thus in a position to take up any bus telegrams sent by the bus master 36 via the field bus 12 and to retransmit them to the subsequent signal units 18 to 24 optionally and in a selectively modified way. In addition, the first control unit 14 is capable, through the receiving module 40, of receiving and logging the bus telegrams returned by the signal units 18 to 24.

The first control unit 14 is thus in a position, even without a bus master functionality of its own, to communicate with the signal units 18 to 24 via the field bus 12. Due to the safety-directed arrangements 42, 52 this permits failsafe data communication and control, independent of the second control unit 16.

Figure 4:
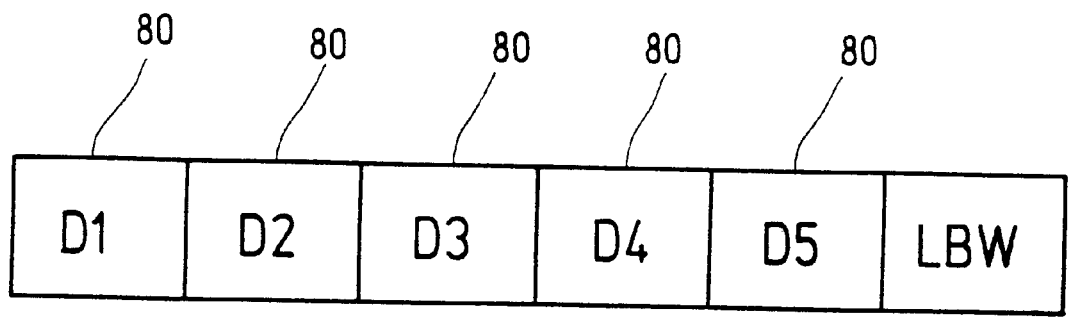
FIG. 4 shows a diagrammatic representation of a bus telegram for the Interbus.

In FIG. 4, a bus telegram, shown diagrammatically, as used with the Interbus is indicated in its entirety by reference numeral 78. The bus telegram 78 has an exactly defined structure, divided into different segments. Each bus telegram begins with a start word, usually described as Loop Back Word (LBW). The start word is followed by different data frames 80 in which useful data, such as control commands or measuring signal values, are transported.

In the case of the Interbus, the bus master 36 generates a bus telegram 78, as mentioned before, and transmits it serially to the downstream communication module 38. The latter receives the bus telegram 78 and stores those data from the data frame 80, that are relevant for the first control unit 14, in the receive memory 68. At the same time, it transmits the bus telegram 78 to the downstream protocol chip 50 of the signal unit 18, for which purpose is may optionally replace data contained in the data frame by data from the transmit memory 70. The bus telegram 78 is then sent by the protocol chip 50 of the signal unit 18 to the signal unit 20 and from there to signal units 22 and 24. At the end of the signal chain, the signal unit 24, being the last signal unit connected, returns the bus telegram 78 to the bus master 36, the bus telegram 78 passing once more all protocol chips 50 as well as the communication module 38 on this way. As soon as the start word LBW is received by the bus master 38, this is taken as an indication that the bus telegram 78 has run sequentially through the field bus 12 a full cycle.

Figure 5:
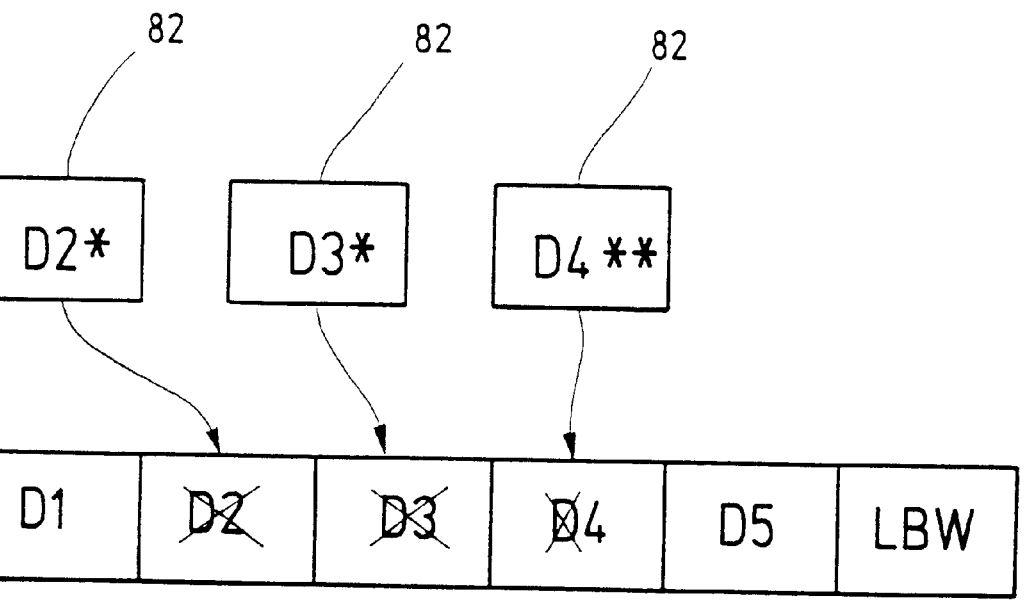
FIG. 5 shows a diagrammatic representation of the procedure of replacing safety-directed data frames by failsafe telegram data in the bus telegram according to FIG. 4.

Due to the data flow described before and to the arrangement of the communication module 38 shown in FIG. 2, the first control unit 14 can communicate with any signal unit 18 to 24, provided the structure of the network is known to it. This means that it is first of all necessary for the first control unit 14 to know at which point of the field bus 12 each signal unit 18 to 24 addressed by it is arranged. In the control system 10 illustrated in FIG. 1, the signal units 18, 20 and 22 are arranged in the positions 2, 3 and 4, if the units connected to the field bus 12 are counted beginning with zero for the bus master 36. For example, in order to transmit control data to the signal unit 20, the first control unit 14 must, accordingly, put the control data into the data frame 80 designated as D3. This is symbolized in FIG. 5 by the data frame 82 with modified data D3*. The data D3 originally contained in that data frame are overwritten by the new data.

Since both the first control unit 14 and the signal unit 20 contain safety-directed arrangements 42, 52 it is possible to build up between them failsafe communication without the necessity for any of these units to have a bus master functionality.

The same applies to the communication of first control unit 14 with the signal units 18 and 22; with regard to communication with the signal unit 22 it will, as a rule, be sufficient to replace the data by modified data D4** only in part. The data intended for the non-safe standard part of the signal unit 22 are not modified by the first control unit 14.

The following is a table by means of which communication across field bus 12 can be followed up once more:

The data intended for the non-safe standard part of the signal unit 22 remain unchanged so that the respective part of the signal unit 22 is addressed by the second control unit 16.

Apart from the control system for controlling safety-critical automated processes, as described above, such modification of data in individual data frames 80, 82 generally can be used also with a field bus 12 with sequentially circulating telegram flow to provide a slave-to-slave communication between stations none of which has a bus master functionality. It is sufficient for this purpose that the protocol chip 58 of a station, that intends to send data to other stations, be supplemented by a transmit memory 70 and, if necessary, by a receive memory 68, in the manner illustrated in FIG. 2. In addition, the station authorized to send needs to have information as to where its addressee is positioned in the field bus 12, in order to modify the correct data frame 80.

This way, it is basically possible to also incorporate a plurality of standard control units, provided with a communication module 38, 40, into the field bus system in order to distribute the control task for non-safety-critical applications to several standard control units.

What is claimed is:

1. A control system for controlling safety-critical processes, having
   a first control unit for controlling said safety-critical processes,
   a plurality of signal units each comprising I/O channels, said plurality of signal units being linked to said safety-critical processes via said I/O channels,
   a field bus connecting said first control unit and said plurality of signal units, said field bus being an Interbus, and
   a bus master for controlling communication on said field bus, said bus master initiating circulating telegram traffic transporting telegram data in a predetermined circulation direction across said field bus, and said bus master being connected to said field bus separately from said first control unit and said plurality of signal units,
   wherein said first control unit is arranged upstream of said plurality of signal units with respect to said circulation direction, and said first control unit comprising a replacer for replacing telegram data addressed to said plurality of signal units.

| Step | Control unit 16 OUT | Control unit 14 IN | Control unit 14 OUT | Signal unit 18 IN/OUT | Signal-einheit 20 IN/OUT | Signal unit 22 IN/OUT | Signal-einheit 24 IN/OUT | Control unit 16 IN |
|---|---|---|---|---|---|---|---|---|
| 0 | LBW | | ED1 | E*D2 | E*D3 | E*D4 + ED4 | ED5 | |
| 1 | AD5 | LBW | LBW | ED1 | E*D2 | E*D3 | E*D4 + ED4 | ED5 |
| 2 | AD4 | AD5 | AD5 | LBW | ED1 | E*D2 | E*D3 | E*D4 + ED4 |
| 3 | AD3 | AD4 | A*D4 + AD4 | AD5 | LBW | ED1 | E*D2 | E*D3 |
| 4 | AD2 | AD3 | A*D3 | A*D4 + AD4 | AD5 | LBW | ED1 | E*D2 |
| 5 | AD1 | AD2 | A*D2 | A*D3 | A*D4 + AD4 | AD5 | LBW | ED1 |
| 6 | | AD1 | AD1 | A*D2 | A*D3 | A*D4 + AD4 | AD5 | LBW |

Each line of the table contains the data present at the input and output shift registers of the different units connected to the field bus 12, at the end of a complete shifting step. The abbreviations used in this table have the following meaning:

EDx: Input data in data frame Dx;
ADx: Output data in data frame Dx;
E*DX: Modified (safe) input data in data frame Dx, and
A*Dx: Modified (safe) output data in data frame Dx.

In data frame D4, only the data intended for the safe part of the signal unit 22 are modified by the first control unit 14.

2. The control system of claim 1, wherein said first control unit and said plurality of signal units each comprise safety-directed arrangements for ensuring failsafe communication across said field bus.

3. A control system for controlling safety-critical processes, having
- a first control unit for controlling said safety-critical processes,
- at least one signal unit comprising I/O channels, said at least one signal unit being linked to said safety-critical processes via said I/O channels,
- a field bus connecting said first control unit and said at least one signal unit, and
- a bus master for controlling communication on said field bus,
- wherein said bus master is connected to said field bus independently from said first control unit and said at least one signal unit, and
- wherein said first control unit and said at least one signal unit each comprise safety-directed arrangements for ensuring failsafe communication across said field bus.

4. The control system of claim 3, wherein said first control unit comprises an independent control program for controlling said safety-critical processes.

5. The control system of claim 3, wherein said safety-critical processes are either in a safe or in an unsafe state, and wherein said first control unit is capable of generating failsafe bus telegrams, the receipt of which causing said at least one signal unit to transfer said safety-critical processes to said safe state.

6. The control system of claim 3, wherein said safety-directed arrangements comprise a multi-channel structure.

7. The control system of claim 6, wherein said multi-channel structure is based on a diversity principle.

8. The control system of claim 3, further comprising a second control unit for controlling non-safety-critical processes.

9. The control system of claim 8, wherein said second control unit is connected to said field bus separately from said first control unit.

10. The control system of claim 8, wherein said second control unit does not comprise specific safety-directed arrangements.

11. The control system of claim 8, wherein said bus master is incorporated in said second control unit.

12. The control system of claim 3, wherein said bus master provides a circulating telegram traffic across said field bus.

13. The control system of claim 12, wherein said field bus is an Interbus.

14. The control system of claim 12, wherein said circulating telegram traffic has a predetermined circulation direction, and said first control unit being arranged upstream of said at least one signal unit with respect to said circulation direction.

15. The control system of claim 14, wherein said telegram traffic comprises telegram data, and wherein said first control unit comprises a replacer for replacing telegram data addressed to said at least one signal unit by failsafe telegram data.

16. The control system of claim 3, further comprising at least two first control units for controlling at least two safety-critical processes.

* * * * *